US009748749B2

(12) United States Patent
Eyles et al.

(10) Patent No.: US 9,748,749 B2
(45) Date of Patent: Aug. 29, 2017

(54) SUPPORT AND RETAINING DEVICE FOR WIRES AND CABLES

(75) Inventors: Jonathan Mark Eyles, Swindon (GB); Giuliano Virgilio, Swindon (GB)

(73) Assignee: Tyco Electronics UK Ltd., Swindon, Wiltshire (GB)

( * ) Notice: Subject to any disclaimer, the term of this patent is extended or adjusted under 35 U.S.C. 154(b) by 480 days.

(21) Appl. No.: 14/343,382

(22) PCT Filed: Sep. 3, 2012

(86) PCT No.: PCT/GB2012/052153
§ 371 (c)(1),
(2), (4) Date: Mar. 6, 2014

(87) PCT Pub. No.: WO2013/034894
PCT Pub. Date: Mar. 14, 2013

(65) Prior Publication Data
US 2014/0215803 A1    Aug. 7, 2014

(30) Foreign Application Priority Data

Sep. 7, 2011 (GB) ...................................... 1115442

(51) Int. Cl.
*H02G 3/04* (2006.01)
*H02G 3/30* (2006.01)

(52) U.S. Cl.
CPC ............. *H02G 3/0406* (2013.01); *H02G 3/30* (2013.01); *Y10T 29/4995* (2015.01)

(58) Field of Classification Search
CPC .......... H02G 3/0406; H02G 3/30; H02G 3/32; H02G 3/26; Y10T 29/4995; H01B 17/06; H01R 4/186
See application file for complete search history.

(56) References Cited

U.S. PATENT DOCUMENTS 3,913,876 A   10/1975 McSherry
4,899,963 A    2/1990 Murphy
(Continued)

FOREIGN PATENT DOCUMENTS

EP      0554702 A1    8/1993
EP      1113552 A1    7/2001
(Continued)

OTHER PUBLICATIONS

International Preliminary Report on Patentability issued by the International Bureau of WIPO, Geneva, Switzerland, dated Mar. 12, 2014, for International Application No. PCT/GB2012/052153; 6 pages.
(Continued)

*Primary Examiner* — Jacob Cigna
*Assistant Examiner* — Lee A Holly
(74) *Attorney, Agent, or Firm* — Faegre Baker Daniels LLP (57) ABSTRACT

A two-component device for supporting and retaining a cable or wire bundle in a channel comprises support part with a support surface in which is formed an elongate recess for a cable tie. The upper part lifts on to a lower part and it secured to the floor of the channel, by means of rivets or the like. The support part has an integral tie bar extending across the elongate recess. The lower part has a corresponding tie bar extending across it, between opposed side walls of the lower part. With the wire bundle in place, the cable tie is passed around it and through the recess, passing under the respective tie bars and secured at to hold the bundle in place against the support, at the same time holding the two parts of the support together.

10 Claims, 6 Drawing Sheets

(56) References Cited

U.S. PATENT DOCUMENTS

| | | | |
|---|---|---|---|
| 7,505,665 B2* | 3/2009 | Lohr | B64C 1/406 385/134 |
| 2005/0196121 A1 | 9/2005 | Lohr | |
| 2006/0201695 A1* | 9/2006 | Kossak | H01R 4/186 174/84 R |
| 2013/0118777 A1* | 5/2013 | Yamaguchi | H01B 17/06 174/135 |

FOREIGN PATENT DOCUMENTS

| | | | | |
|---|---|---|---|---|
| FR | 2719167 A1 | 10/1995 | | |
| JP | WO 2012011502 A1* | 1/2012 | | B60R 16/0215 |

OTHER PUBLICATIONS

International Search Report and Written Opinion issued by the European Patent Office, dated Dec. 3, 2012, for International Application No. PCT/GB2012/052153; 9 pages.

Search Report issued by the British Intellectual Property Office, dated Jan. 9, 2012, for Great Britain Application No. GB 1115442.4; 3 pages.

* cited by examiner

SUPPORT AND RETAINING DEVICE FOR WIRES AND CABLES

This invention relates to a device for supporting and retaining cables or wire bundles in an elongate channel, the device having particularly utility in complex electrical supply systems, for example in aircraft.

BACKGROUND OF THE DISCLOSURE

In complex electrical supply systems bundles of electrical wires, tied together at intervals along their length by cable ties, are retained in ducts or channels to prevent entanglement, damage or interaction with other parts of the system. During assembly, wires may be fed into elongate ducts from one end or retained in open channels. The latter arrangement is preferred in some modern systems. The use of such open channels facilitates access and maintenance, but means that additional means must be provided to retain the wires within the channels while reducing to a minimum the risk of chafing or other damage.

SUMMARY OF THE DISCLOSURE

According to a first aspect of the present invention, there is provided a two-component device for supporting and retaining a cable or wire bundle in a channel, the device compensating a support part having a support surface with an elongate recess therein and a bar for a cable tie extending transversely across and above said recess to define therebeneath a channel for a cable tie, and a base part having a base with means for securing it to the floor of a cable channel, the support part being securable to the base part, for example by means of a friction or snap fit, the base part also having a cable tie bar extending across and above its base, the cable tie bar of the base part being shaped and positioned to fit immediately below the tie bar on the support part, so that a cable tie can pass through the recessed aperture in the support part and around both cable ties so as to secure a cable or wire bundle supported on the shaped surface of the support part.

The support surface preferably has a central concave portion extending in the direction of said recess and convex portions on either side of said recess and the tie bar extending across it.

The support part is preferably of elongate shape, with the elongate recess extending in its longitudinal direction and the bar for the cable tie extending at right angles to the longitudinal direction.

The support part preferably has on its underside a pair of projections to engage corresponding fittings to the lower part, these preferably being positioned at opposite ends of the elongate recess. The projections may suitably be of cylindrical shape.

The base part is also preferably of elongate shape, with an upwardly projecting formation at each end thereof to engage the downward projections the upper part with a friction or snap fit. Preferably the projecting formations on the base part define cylindrical recesses each of which surrounds a hole through the base for securing it to the floor of a wire channel.

The support part of the two component support is preferably saddle-shaped, i.e. being substantially arcuate in vertical cross section when viewed from one end, the surface having a minimum radius of curvature at the mid point, coinciding with the bar for the cable tie with this radius increasing gradually in each longitudinal direction away from the cable tie bar. The width of the support part also preferably increases in each longitudinal direction away from the bar.

BRIEF DESCRIPTION OF THE DRAWINGS

Preferred embodiments of the invention will now be described with reference to the accompanying drawing wherein.

DETAILED DESCRIPTIONS

Referring first to FIGS. 1 to 4, a cable support and retaining device in accordance with the invention comprises support part 10 and a base part 12 designed to fit together and to be secured in a wire channel. Both parts are preferably made of a suitable plastics material such as polypropylene.

The support part 10 is generally saddle-shaped, being elongate with a narrow central portion 26 and flared end portions 28. The surface 14 of the support part provides the support for wires or cables, and is designed to be free of edges that might come into contact with, and potentially damage, wires on the support. The surface 14 curves downwardly on each side of a longitudinal axis of the support part, the radius of curvature being smallest at the central part 26 and increasing gradually to a maximum at the end 28.

Figure 1:
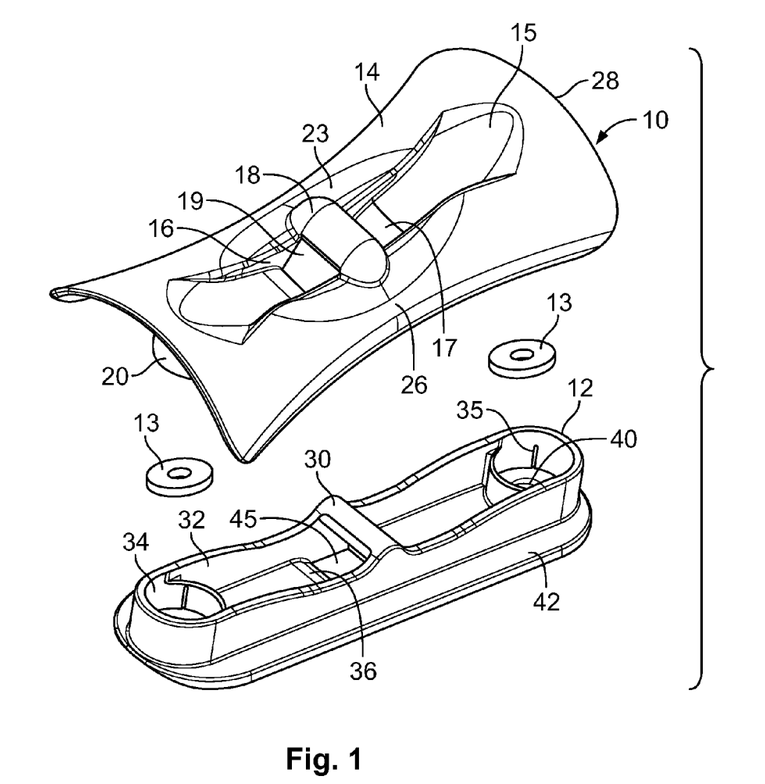
FIG. 1 is a perspective view from above, a two component support and retaining in accordance with the present invention, with the two parts separated.
Figure 3A:
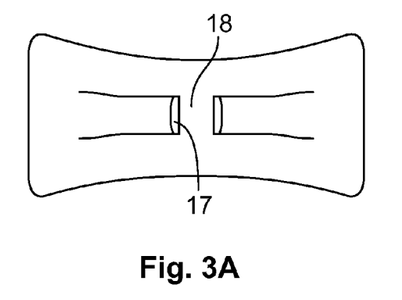
FIGS. 3A, 3B, 3C and 3D are respectively a top plan view, a side elevation, a bottom plan view and an end elevation of the support part of the device of FIG. 1.
Figure 3B:
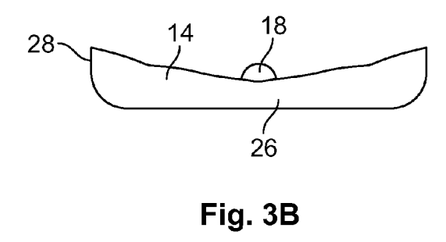
Figure 3C:
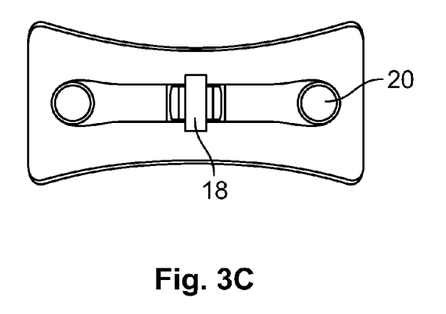
Figure 3D:
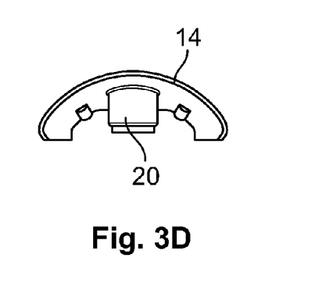

An elongate recess 16, for a cable tie extends longitudinally along a central portion of the support part 10 and is bridged by a bar 18 extending transversely across the centre of the support. The recess has a pair of ramps 15 extending downwardly towards one another from opposite ends of the support surface, each terminating in a more steeply sloping section 17. The two portions 17 are separated by a gap 19 under the bar 18.

Figure 2:
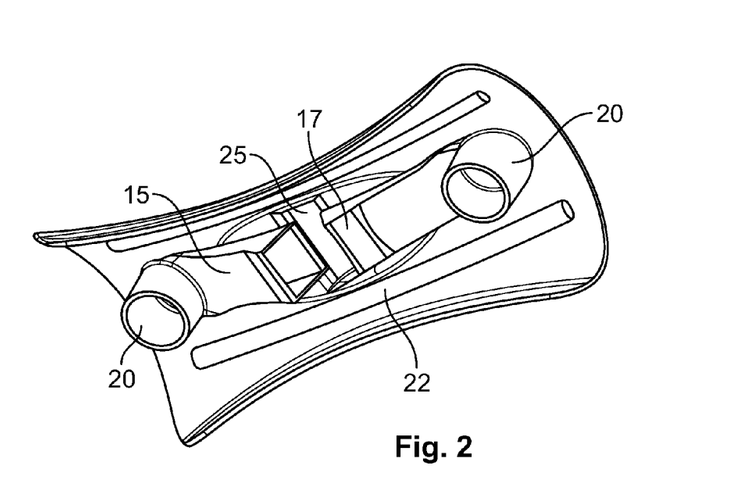
FIG. 2 is a perspective view of the underside of the support part of the device of FIG. 1.

On the underside of the support part, shown in FIG. 2, longitudinal strengthening ribs 22 provided, these being integrally moulded. Each end of the underside of the support part is an annular downward projection 20, to engage in a corresponding annular recess 34 of the base part 12.

As can be seen in FIG. 2, the underside 25 of the tie bar 18 is concave, to engage the correspondingly convex upper side of a matching tie bar 30 on the base part 12.

Figure 4A:
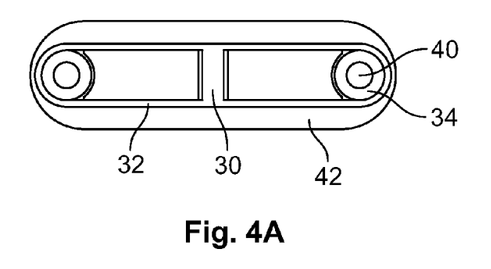
FIGS. 4A, 4B and 4C are respectively a top plan view, a side elevation and an end elevation of the base part of the device of FIG. 1.
Figure 4B:
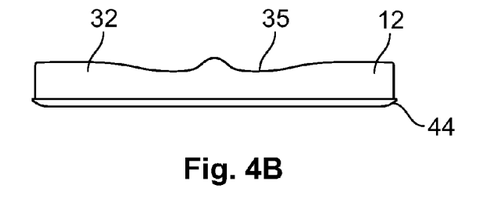
Figure 4C:
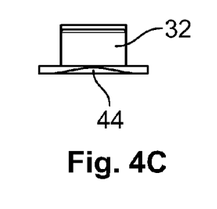

The base part comprises a base 42 of elongate shape with rounded ends, the bottom surface of the base curving upwards to the top surface at each end 44 to enable the base to fit neatly across the floor of a cable channel having correspondingly curved inside edges.

The base part also has a peripheral wall 32 to parallel straight sides extending longitudinally, connected by semicircular ends, terminating just short of the ends of the floor.

The base has a rectangular central opening 45 defined between opposite bottom edges of the parallel sections of wall 32 and by opposed edges 36 of the base 42 each of which tapers downwardly to form an edge with the bottom surface of the base.

Above the aperture 45, a cable tie bar 30 extends across the base part supported at each end by one of the parallel sections of wall 32.

At the bottom of each annular recess 34 is a through-hole 40 on the floor of the base part for attaching the base part to the bottom of a cable channel, as will be described below. Positioned at intervals around the inner wall of each recess 34 are vertical ribs 35, whereby the downward projections 20 of the upper part can engage with a friction fit in the annular recesses of the base part when the support is assembled. Washers 13 are provided to fit within the annular recesses 34 below the projections 20 of the support part.

As can be seen in FIG. 1, the upper surface of the cable tie bar 18 is rounded, and on each side of the channel 16 surface portions 23 of the upper part curve downwardly towards the edge of the channel so as not to present sharp edges to engage the surfaces of cables or wires on the support.

Figure 5:
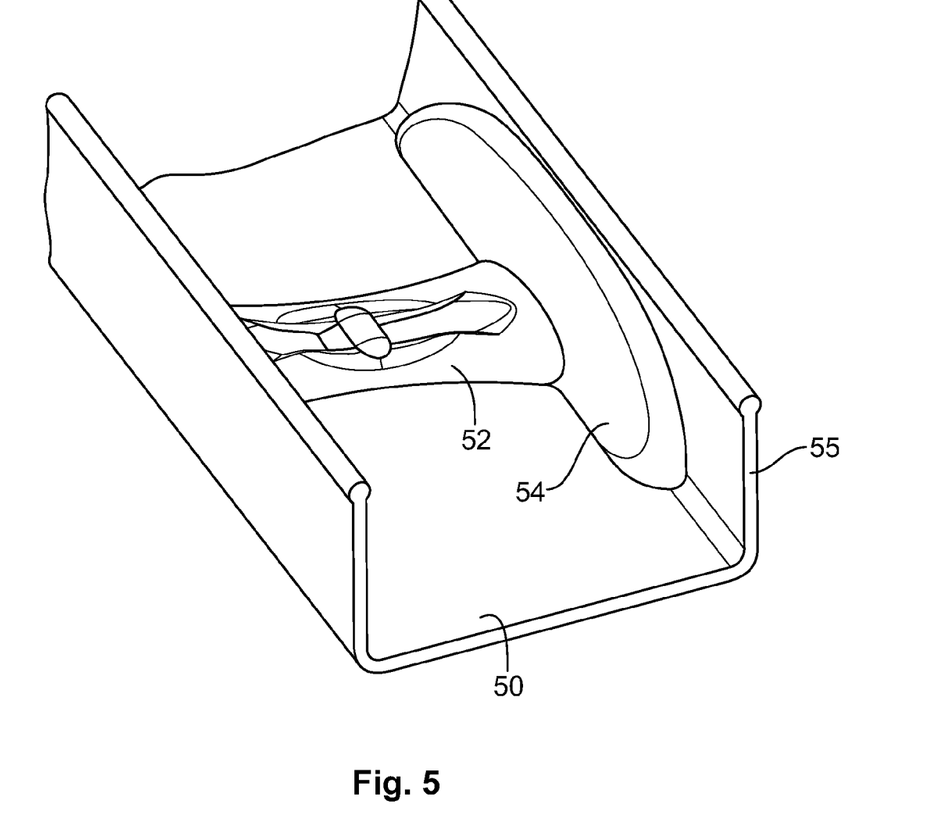
FIG. 5 is a perspective view showing an assembled support and retaining device in accordance with a second embodiment of the invention, installed in an open wire channel.

Referring now to FIG. 5, a wire or cable support device 52 in accordance with the invention is installed in a wire channel 50. The channel is an open one, suitably formed of extruded aluminium or the like. The wire support device 52 extends across the width of the channel and is secured to the floor of the channel by rivets or the like, as will be described in more detail below. The support device is essentially as described in FIGS. 1 to 4, except that at one end the support part has an integrally moulded guard section 54 lying alongside one side wall 55 of the channel. The purpose of this guard section is to overlie fixings such as screw heads. Inwardly facing surfaces of the guard section 54 are all smooth and rounded, so as not to offer any sharp edges to damage wires running along the channel.

Figure 6:
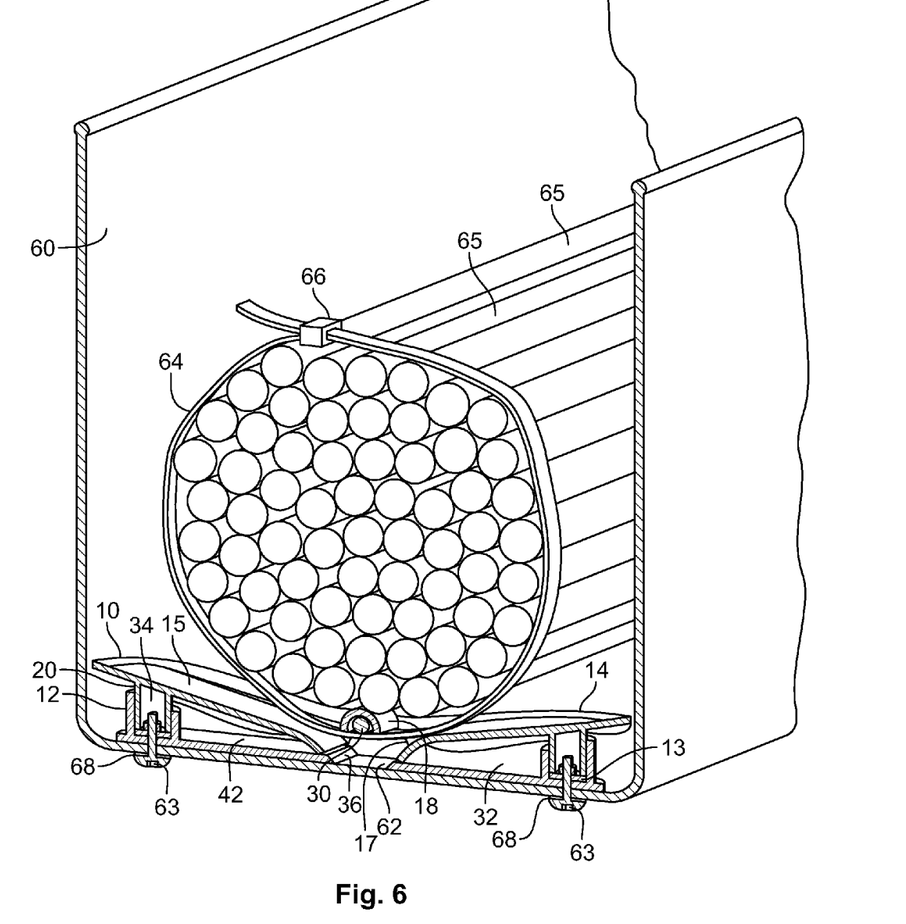
FIG. 6 is a perspective view, partly in cross section, of a wire support and retaining device in accordance with the invention, installed in a wire channel and supporting a wire bundle retained by a cable tie.

Referring now to FIG. 6, a bundle of wires 65 runs along a wire channel 60 and is supported by a support and retaining device 10, 12 as described in FIGS. 1 to 4.

To install the device, first the base part 12 is positioned across the floor of the channel with its holes 40 corresponding with holes at 68 in the floor of the channel.

Washers 13 are placed in each of the recesses 34 of the base part, and the base part and washers are fixed to the floor by rivets 63 or the like through holes 40 and 68.

The support part 10 of the support device is then fitted to the base part, its annular downward projections 20 engaging in the recesses 34 with a friction fit.

As can be seen in FIG. 6, when the support device is installed the downwardly sloping surfaces 17 of the recess of the support part adjoin the downwardly sloping edges 36 in the floor of the base part, facing each other on opposite sides of the gap 45, to form relatively smooth continuous cam surfaces.

The wires of bundle 65 are laid across the support surface 14 of the upper part of the support, the tie bar 18 projecting upwardly between two adjacent wires, helping to position the bundle. A free end of a cable tie 64 is then placed into the channel 16, engaging one of the downwardly sloping surfaces 15 and pushed from above so that it passes under the combined cable tie bars 18, 30 passing across the floor 62 of the channel to engage a sloping edge 36 of the floor of the base part, so that as it is pushed further it slides up the sloping surfaces 17, 15 on the opposite side of the recess of the support part, emerging from the channel 16 on the other side of the bundle. The two ends of the cable tie can then be secured at 66 as shown in FIG. 6. It will be seen that in this secured position the cable tie is not only holding the wire bundle together, but it is also securing it to both the support and base parts of the wire support, which is in turn secured to the floor of the wire channel.

Should either part of the wire support break or be damaged, or begin to separate from the other part, the wire bundle will remain anchored to at least one part of the support since it passes around both cable tie bars. In the position shown in FIG. 6, the cable tie is actually holding the two parts of the support device together, as well as holding the wire bundle together.

Figure 7:
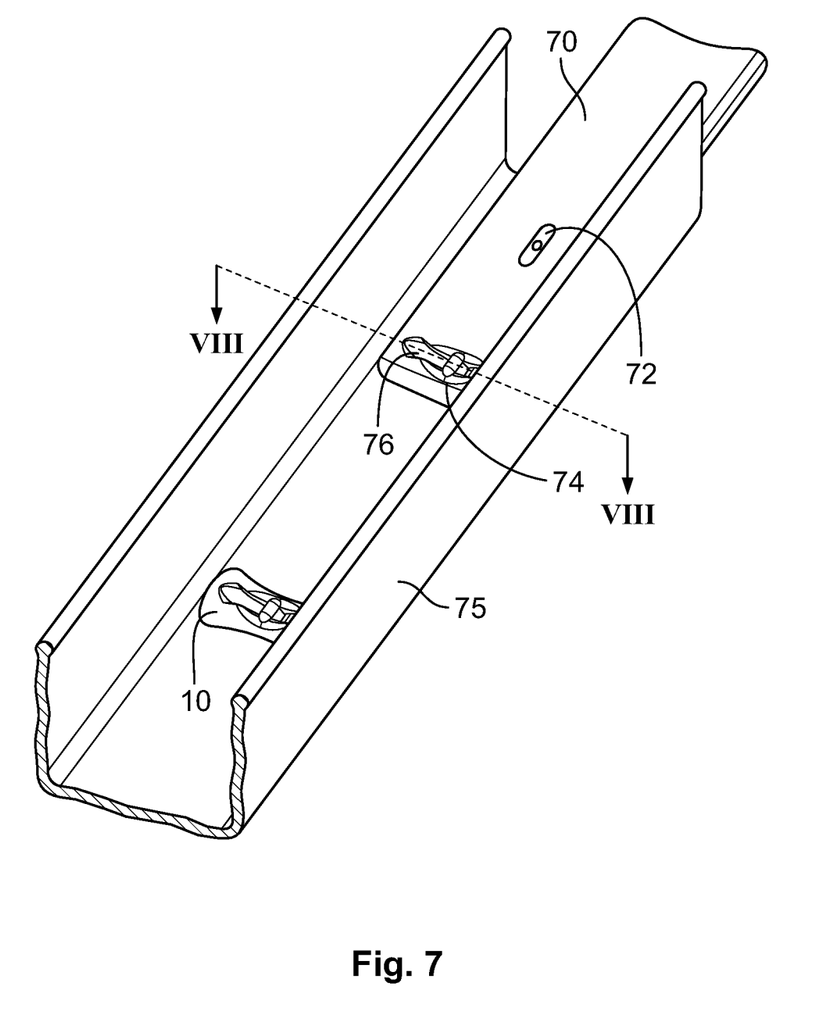
FIG. 7 is a perspective view of a pair of supports and retaining devices in accordance with a further embodiment of the invention installed in a wire channel.

FIG. 7 shows wire channel 75 in which are mounted two wire supports 10, 70, both in accordance with the invention. The support 10 is the same as that shown in FIGS. 1 to 4, works in the same way as in FIG. 6, and need not therefore be described further. The support device 70 is in accordance with a different embodiment of the invention, the elongate transverse channel being formed at one end of an elongate rectangular support the upper surface of which is slightly concave, about an axis parallel to the channel.

On the underside of the support 70, shown in broken lines in FIG. 7, is an elongate slot 72 parallel to the wire channel to receive a pin, rivet or other fixing, this fixing having some play in the longitudinal direction of the channel.

Supports such as 70 can be used to bridge from one wire channel to the next, the support overlying the join between channels to protect the wire bundle from sharp edges and the like.

At the nearer end of support 70 shown in FIG. 7, the transverse edge 74, adjacent channel 76 provided for a cable tie, is rounded so as not to present a sharp edge to a wire bundle in the channel.

Figure 8:
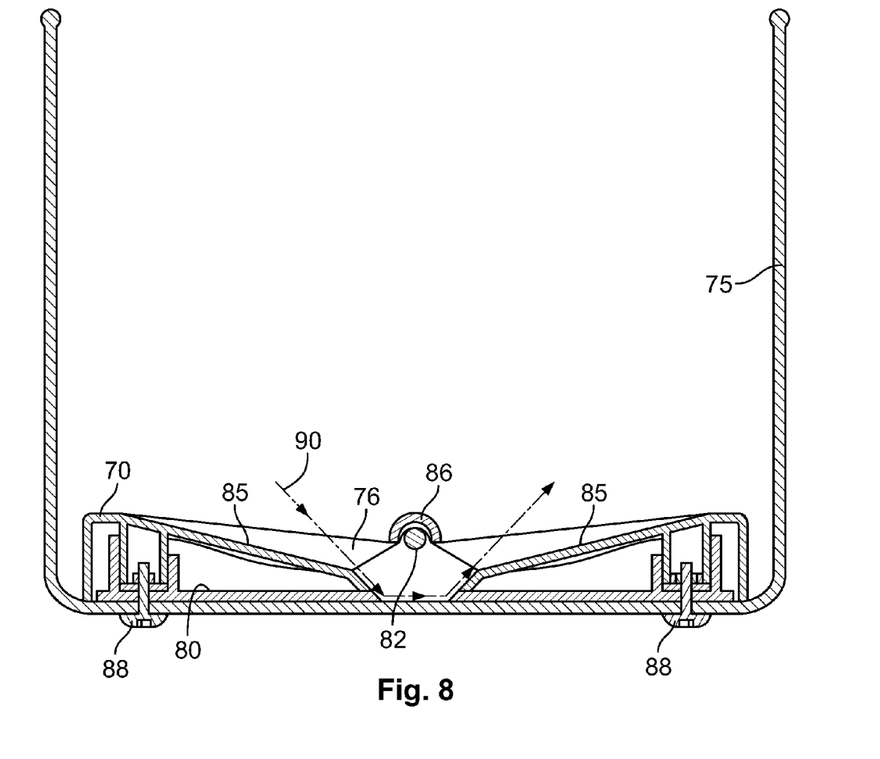
FIG. 8 is a vertical cross section of the line viii-viii of FIG. 7.

As shown in FIG. 8, the vertical cross section of the support 70 through its cable tie channel 76 is essentially identical to that of the embodiments of FIGS. 1 to 6. The cable tie bar 86 on the support surface overlies a bar 82 of a base part 80, secured to the channel floor by rivets 88. The base part 80 can be identical to that shown in FIG. 4. The dotted arrow 90 shows the possible path of a cable tie down a sloping surface 85 of channel 76 on one side of the support, across the floor of the channel and up the cam surfaces formed by the upper and base parts of the support to emerge on the other side of the cable tie bar 82, 86.

The invention claimed is:

1. A two component device for supporting and retaining a cable or wire bundle in a channel, the device comprising a support part having a support surface with an elongate recess therein and a tie bar for a cable tie extending transversely across and above said recess to define thereberneath a channel for a cable tie, and a base part having at least one securing member for securing the base part to a floor of a cable channel, the support part being securable to the base part, the base part also having a cable tie bar extending across and above its base where the cable tie bar of the base part being shaped and positioned to fit immediately below the tie bar on the support part;

whereby a cable tie can pass through the elongate recess in the support part and under both cable ties so as to secure a cable or wire bundle on the shaped support surface of the support part.

2. A device according to claim 1, wherein the at least one securing member comprises at least one hole through the base of the base part to receive a fastener.

3. A device according to claim 1, wherein the support part is securable to the base part by means of a friction or snap fit.

4. A device according to claim 1, wherein the base part has a pair of rivet holes in its base surrounded by annular recesses, and the support part is securable to the base part by means of annular projections on the underside of the support part engaging in said annular recesses.

5. A device according to claim 1, wherein said support and base parts are of elongate shape, the elongate recess extending longitudinally relative to the support and base parts.

6. A device according to claim 5, wherein the cable tie bar of the support part extends transversely to the longitudinal direction of the support surface, and lies above said support surface at its midpoint.

7. A device according to claim 6, wherein the support surface slopes upwardly on each side of the tie bar, in a direction away from the tie bar.

8. A device according to claim 6, wherein the support surface curves downwardly from each end of the tie bar in a direction transverse to the longitudinal direction of the support part.

9. A device according to claim 5, wherein the width of the support part increases in each longitudinal direction from the tie bar to the longitudinal ends of the support part.

10. Method of securing cable or wire bundle in a cable channel using a support and retaining device according to any preceding claim, which comprises the steps of:
fastening the base part of the device to a floor of the cable channel;
fitting the support part of the device to the base part;
placing a cable or wire bundle in the channel to lie across the support surface of the support part of the support and retaining device;
passing a cable tie through the elongate recess of the support surface of the support and retaining device, under the tie bars of the device and around the cable or wire bundle; and
securing the ends of the cable tie together to secure the cable or wire bundle to both parts of the support and retaining device.

* * * * *